United States Patent
Nayebi et al.

[11] Patent Number: 6,141,064
[45] Date of Patent: *Oct. 31, 2000

[54] LUMINANCE SIGNAL GENERATION CIRCUIT WITH SINGLE CLAMP IN CLOSED LOOP CONFIGURATION

[75] Inventors: Mehrdad Nayebi, Palo Alto; Duc Ngo, San Jose, both of Calif.

[73] Assignees: Sony Corporation, Tokyo, Japan; Sony Electronics, Inc., Park Ridge, N.J.

[ * ] Notice: This patent is subject to a terminal disclaimer.

[21] Appl. No.: 08/848,385

[22] Filed: May 8, 1997

[51] Int. Cl.⁷ ....................................... H04N 9/72
[52] U.S. Cl. ................... 348/659; 348/531; 348/642; 348/661; 348/697
[58] Field of Search ................... 348/642, 659, 348/660, 661, 712, 689, 690, 691, 692, 695, 697, 684, 521, 528, 531, 663, 665

[56] References Cited

U.S. PATENT DOCUMENTS

| | | | |
|---|---|---|---|
| 4,295,161 | 10/1981 | Hettiger | 358/34 |
| 4,473,839 | 9/1984 | Noda | 358/41 |
| 4,667,242 | 5/1987 | Hagino | 358/174 |
| 4,717,953 | 1/1988 | Chang et al. | 358/34 |
| 4,866,511 | 9/1989 | Belmares-Sarabia et al. | 358/27 |
| 4,930,004 | 5/1990 | Yamamoto et al. | 358/29 |
| 4,965,669 | 10/1990 | Canfield et al. | 358/171 |
| 5,126,831 | 6/1992 | Nakagawara | 348/695 |
| 5,182,497 | 1/1993 | Yamate et al. | 315/383 |
| 5,272,522 | 12/1993 | Lagoni | 358/30 |
| 5,291,276 | 3/1994 | Matsumoto | 348/708 |
| 5,339,114 | 8/1994 | Lagoni et al. | 348/673 |
| 5,371,552 | 12/1994 | Brummette | 348/697 |
| 5,448,308 | 9/1995 | Walby | 348/692 |
| 5,638,137 | 6/1997 | Thomas | 348/673 |
| 5,864,371 | 1/1999 | Nayebi | 348/695 |

*Primary Examiner*—Mark R. Powell
*Assistant Examiner*—Wesner Sajous
*Attorney, Agent, or Firm*—Haverstock & Owens LLP

[57] ABSTRACT

A luminance signal generation circuit with single clamp generates a separate luminance signal Y by combining RGB input signals in a weighted manner within a Y-Matrix circuit. During a burst period the single clamping circuit is enabled. When enabled, the single clamping circuit compares the separate luminance signal Y to a constant reference voltage signal. A difference signal, representing the difference between the separate luminance signal Y and the constant reference voltage signal, is used to adjust a blanking level of the RGB input signals until the blanking level of the separate luminance signal Y is equal to the constant reference voltage signal. During the non-burst periods the single clamping circuit is disabled and the Y-Matrix circuit combines the RGB input signals into the separate luminance signal Y. Preferably, the single clamping circuit sets the blank level of the separate luminance signal Y to a level equal to two volts. NPN transistor follower circuits are utilized within the clamping circuit and with input receiving circuits to provide the RGB input signals to the Y-Matrix circuit.

13 Claims, 4 Drawing Sheets

LUMINANCE SIGNAL GENERATION CIRCUIT WITH SINGLE CLAMP IN CLOSED LOOP CONFIGURATION

FIELD OF THE INVENTION

The present invention relates to the field of clamping circuits. More particularly, the present invention relates to the field of clamping circuits for clamping an RGB video signal and a resulting separate luminance or Y signal.

BACKGROUND OF THE INVENTION

A composite color video signal includes horizontal synchronizing signals, a burst signal superimposed onto the pedestal level at the back porch of the horizontal synchronizing signal and a video information signal. The video information signal comprises a chrominance subcarrier having different phases amplitude-modulated with chrominance information. The composite color video signal includes both luminance and chrominance information. Separator circuits are utilized to separate the horizontal synchronizing signal and the burst signal from the incoming video signal. The burst signal has a burst signal frequency equal to 3.58 MHz, which is the frequency of the chrominance subcarrier $f_{SC}$.

The video signal can also be separated into a separate chrominance or C signal and separate luminance or Y signal. A properly configured television, monitor or display will accept the separate chrominance C and luminance Y signal. Within the video signals, the values of the components are determined by their relative amplitude with respect to the blank or pedestal level. It is therefore essential that the blank or pedestal level is maintained at a known level so that the value of the components can be readily determined by the system. The blank level of a video signal is typically clamped to a known DC level allowing the values of the components within the signal to be determined by comparing their amplitude with respect to the known DC level. The blank level of the separate chrominance C and luminance Y signals must also be clamped to a known blank or pedestal level in order to determine the true values of their components.

A video encoder circuit of the prior art with four clamping circuits is illustrated in FIG. 1. The video encoder circuit receives an RGB signal and generates a composite video signal, a separate luminance signal Y and a separate chrominance signal C from the RGB signal. The RGB signal includes separate Red, Green and Blue signals which are combined within the encoder 10, into the separate luminance signal Y, by a Y-matrix circuit 12. It should be apparent that the encoder circuit 10 also includes circuitry to encode the composite video signal CV and the separate chrominance signal C, which is not illustrated in FIG. 1. The Y-matrix circuit 12 combines each of the Red, Green and Blue signals in accordance with an appropriate weighting factor to obtain weighted signals, for forming the separate luminance signal Y. The equation implemented by the Y-matrix circuit is:

$$Y=0.30*R+0.59*G+0.11*B \quad (1)$$

Accordingly, in order to derive the separate luminance signal Y, the Red, Green and Blue input signals are combined according to equation (1), with the Red, Green and Blue signals comprising unequal components of the separate luminance signal Y.

When bringing electrical signals into a system from an outside system, it is typically necessary to shift the signals into an appropriate voltage range to compensate for any difference in signal voltage resulting from a difference in absolute ground potential between the two systems. This operation is performed by a clamping circuit which shifts the range of the signals into the range expected by the receiving system. For a video signal, as described above, such a clamping circuit will clamp the blank level of the signal to a known level, in order that the components of the signal can be readily determined.

As illustrated in FIG. 1, the clamping circuits 14, 16 and 18 are used to adjust the Red, Green and Blue input signals received from an outside system, to an appropriate level expected by the Y-matrix circuit 12. The clamping circuits 14, 16 and 18 shift the blank levels of the Red, Green and Blue input signals, respectively, to a known DC level.

The Y-matrix circuit 12 combines the clamped Red, Green and Blue input signals, in a weighted fashion according to equation (1), to form the separate luminance signal Y which is provided from the output of the Y-matrix circuit 12. A fourth clamping circuit 20 is then used to shift the DC voltage level of the separate luminance signal Y provided from the Y-matrix circuit 12, before it is output from the video encoder circuit 10.

The clamping circuits 14, 16, 18 and 20 require extra circuitry to be added to the video encoder circuit 10. Each clamping circuit typically includes a large capacitor which is external to the video encoder circuit 10. Not only do these large capacitors take up valuable space within the system, but when the video encoder circuit 10 is implemented within an integrated circuit, a pin for each of these external capacitors is required, thus increasing the necessary size of the video encoder circuit 10.

In order to drive state-of-the-art high performance monitors the clamping circuits must also be capable of passing signals at speeds of at least 33 MHz. Conventional approaches utilize a differential amplifier with high speed NPN and PNP transistors to replicate the video signal for driving such high performance monitors. As is well known among those skilled in the art, such high-speed PNP transistors are expensive to include within a system or integrated circuit. Accordingly, such a conventional approach requires a relatively expensive process to manufacture and is still unable to meet the speed requirements for driving high performance monitors. What is needed is a clamping circuit which requires less external components, takes up less space and provides higher performance characteristics than conventional designs without using high speed PNP transistors.

SUMMARY OF THE INVENTION

A luminance signal generation circuit with single clamp generates a separate luminance signal Y by combining RGB input signals in a weighted manner within a Y-Matrix circuit. During a burst period the single clamping circuit is enabled. When enabled, the single clamping circuit compares the separate luminance signal Y to a constant reference voltage signal. A difference signal, representing the difference between the separate luminance signal Y and the constant reference voltage signal, is used to adjust a blanking level of the RGB input signals until the blanking level of the separate luminance signal Y is equal to the constant reference voltage signal. During the non-burst periods the single clamping circuit is disabled and the Y-Matrix circuit combines the RGB input signals into the separate luminance signal Y. Preferably, the single clamping circuit sets the blank level of the separate luminance signal Y to a level equal to two volts. NPN transistor follower circuits are utilized within the clamping circuit and with input receiving circuits to provide the RGB input signals to the Y-Matrix circuit.

DETAILED DESCRIPTION OF THE PREFERRED EMBODIMENT

Figure 1:
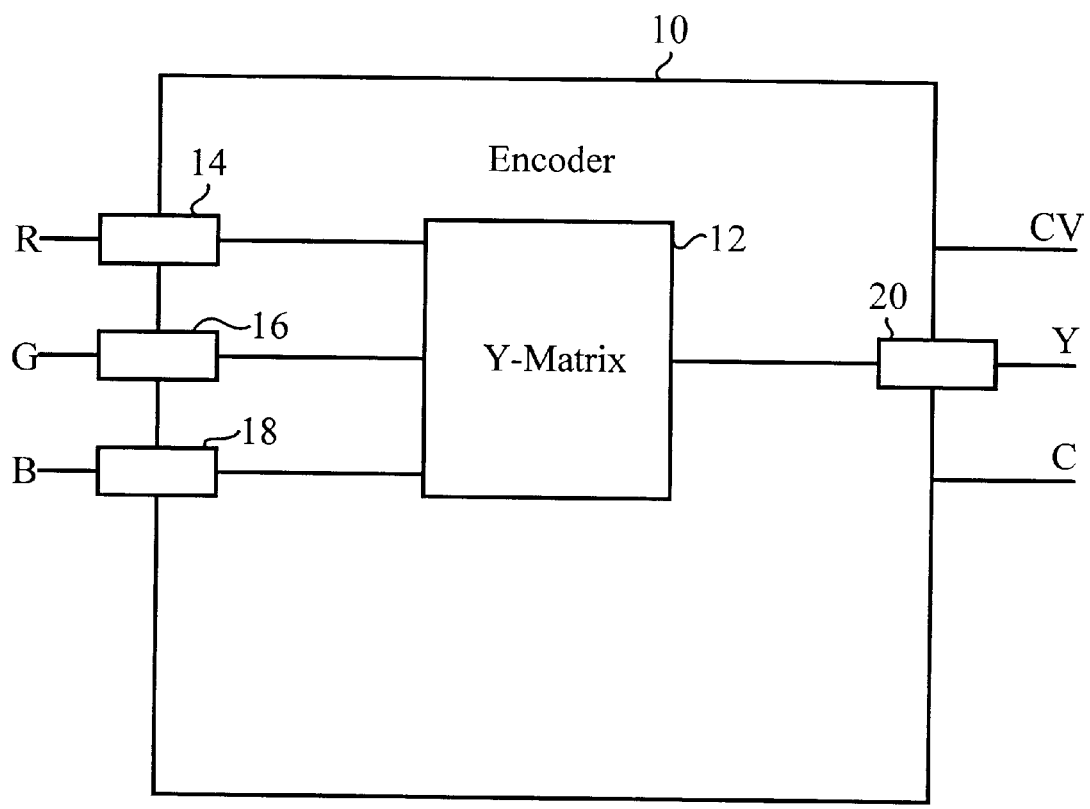
FIG. 1 illustrates a video encoder circuit of the prior art including four clamping circuits and a Y-matrix circuit.

A luminance signal generation circuit with a single clamp generates the separate luminance signal Y using a single clamping circuit to clamp the blanking level of the RGB input signals and the resulting separate luminance signal Y, output from a Y-Matrix circuit, to a known level during a burst period. The separate luminance signal Y output from the Y-Matrix circuit is provided as a feedback signal to the single clamping circuit. The single clamping circuit is enabled only during the burst period. The blanking level of the separate luminance signal Y is then compared, during the burst period, to a constant voltage reference level. Any difference between the separate luminance signal Y and the constant voltage reference level is compensated for by the single clamping circuit at the input receiving circuits, which receive the RGB input signals, and then provide the RGB input signals to the Y-Matrix circuit.

Each period within a video signal includes a horizontal synchronization phase, a burst phase and a video information phase. This is true for both the RGB input signals and the separate luminance signal Y. The values carried within the video signals are determined by comparing the difference between their amplitude and the blank level of the signal. The luminance signal generation circuit with single clamp of the present invention sets the blank level of the separate luminance signal Y formed from the RGB input signals to a known level so that the generated separate luminance signal Y accurately represents the information carried by the RGB input signals. The blank level of the RGB input signals is also set to the known level by the single clamping circuit. In the preferred embodiment of the present invention, the blank level is set to a level equal to two volts.

A burst flag signal is provided to the luminance signal generation circuit with single clamping circuit. This burst signal represents the presence of the burst signal and thereby the burst phase of the video signal to be encoded. During the period when the burst flag signal is active and the burst signal is present within the video signal, the single clamping circuit clamps the blank level of the separate luminance signal Y to the appropriate level, by clamping the RGB input signals to appropriate levels. The clamping circuit includes a differential amplifier which is only enabled during the burst period and when enabled, compares the DC level of the separate luminance signal Y to a constant voltage reference signal. The difference between the DC level of the separate luminance signal Y and the constant voltage reference signal is output from the differential amplifier and provided to the RGB input circuits for adjusting the blanking level of the RGB input signals and ultimately of the resulting separate luminance signal Y to the appropriate blanking level. Once the blank level of the separate luminance signal Y is clamped to the appropriate level it will remain there throughout the non-burst period of the separate luminance signal Y.

Figure 2:
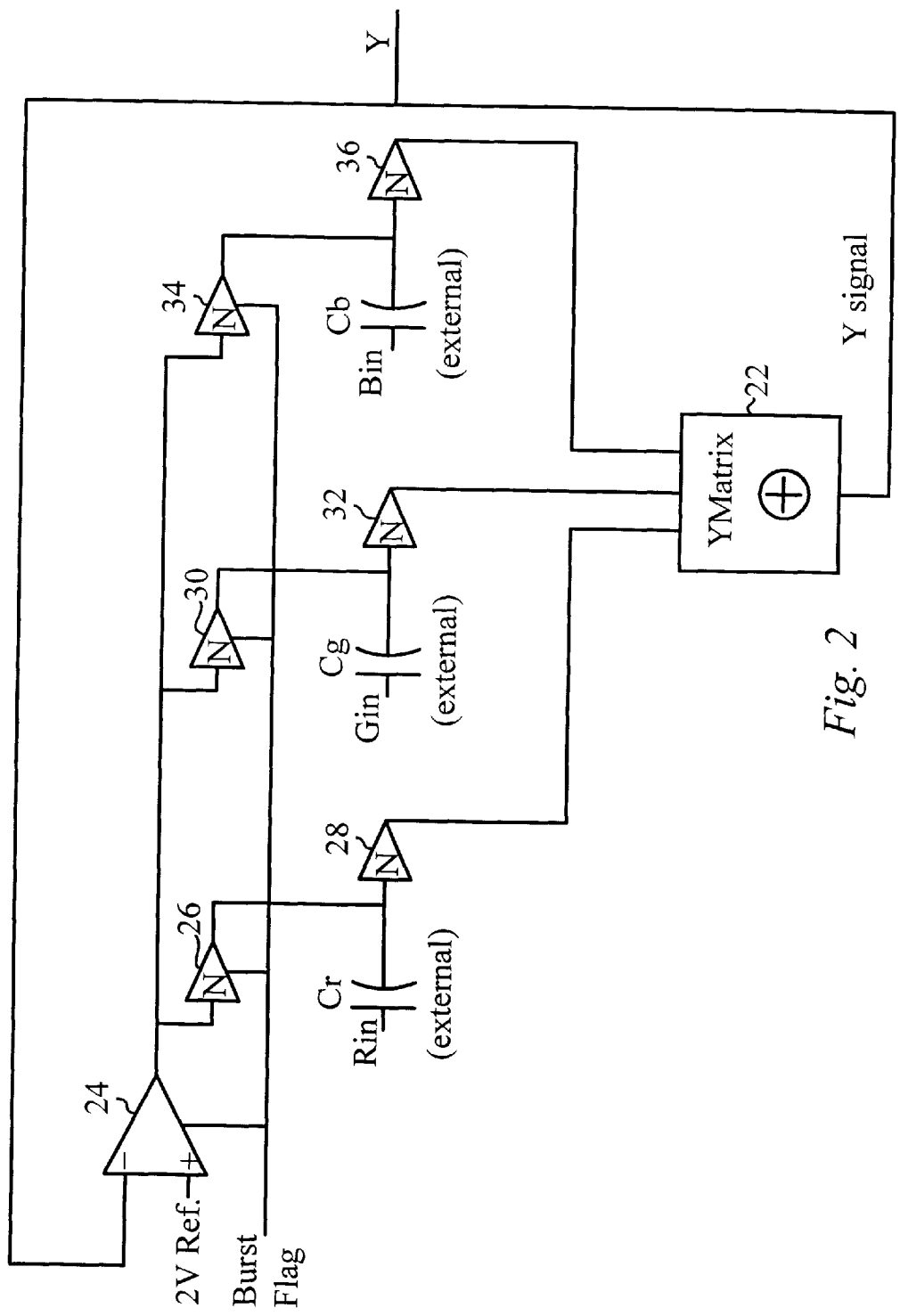
FIG. 2 illustrates a block diagram of a luminance signal generation circuit including a single clamping circuit according to the present invention.

A block diagram of a luminance signal generation circuit with single clamp, according to the present invention, is illustrated in FIG. 2. A red input signal Rin is coupled to a first terminal of a capacitor Cr. A green input signal Gin is coupled to a first terminal of a capacitor Cg. A blue input signal Bin is coupled to a first terminal of a capacitor Cb. Together, the red input signal Rin, the green input signal Gin and the blue input signal Bin form an RGB input signal which is encoded into a separate luminance signal Y by the Y-matrix circuit 22.

A constant voltage reference signal is coupled to a positive input of a differential amplifier 24. In the preferred embodiment of the present invention, the constant voltage reference signal is equal to two volts. An output of the differential amplifier 24 is coupled to inputs of NPN transistor follower circuits 26, 30 and 34. An output of the NPN transistor follower circuit 26 is coupled to an input of an NPN transistor follower circuit 28 and to a second terminal of the capacitor Cr. An output of the NPN transistor follower circuit 30 is coupled to an input of an NPN transistor follower circuit 32 and to a second terminal of the capacitor Cg. An output of the NPN transistor follower circuit 34 is coupled to an input of an NPN transistor follower circuit 36 and to a second terminal of the capacitor Cb. Outputs of the NPN transistor follower circuits 28, 32 and 36 are coupled as inputs to the Y-matrix circuit 22. An output of the Y-matrix circuit 22 provides the separate luminance signal Y as a weighted combination of the input signals Rin, Gin and Bin, according to the ratios of Equation 1. The output of the Y-matrix circuit 22 provides the separate luminance signal Y and is coupled to a negative input of the differential amplifier 24 in a closed-loop feedback configuration.

A burst flag signal is coupled to enable the differential amplifier 24 and the NPN transistor follower circuits 26, 30 and 34. The burst flag signal represents the time period during which a burst signal is present within the video signals. The burst flag signal is active when the burst signal is present within the video signals. When the burst flag signal is active, the differential amplifier 24 and the NPN transistor follower circuits 26, 30 and 34 are enabled. Correspondingly, when the burst flag signal is inactive, the differential amplifier 24 and the NPN transistor follower circuits 26, 30 and 34 are disabled.

When the burst flag signal is active, the differential amplifier 24 compares the separate luminance signal Y, provided from the Y-Matrix circuit 22, to the constant voltage reference signal. A signal representing the difference between the separate luminance signal Y and the constant voltage reference signal is provided from the differential amplifier 24 to the inputs of the NPN transistor follower circuits 26, 30 and 34. The NPN transistor follower circuits 26, 30 and 34 pass the differential output signal from the differential amplifier 24 to the inputs of the NPN transistor follower circuits 28, 32 and 36, when the burst flag signal is active. The NPN transistor follower circuits 28, 32 and 36 are implemented as buffer circuits and pass through the signals at their inputs to the Y-Matrix circuit 22.

The Y-Matrix circuit 22 multiplies each of the signals provided from the NPN transistor follower circuits 28, 32 and 36 by an appropriate weighting factor, according to the equation (1), and provides the resulting separate luminance signal Y from its output. During the period when the burst flag signal is active, the clamping circuit is only satisfied when the separate luminance signal Y is equal to the constant reference voltage signal. Therefore, when the burst flag signal is active, the following equation applies:

$$0.30*Rin+0.59*Gin+0.11*Bin=2.0 \text{ V} \qquad (2)$$

During the time period when the burst flag signal is active, the output of the differential amplifier 24 is provided to be combined with each of the input signals Rin, Gin and Bin. Accordingly, each of the input signals Rin, Gin and Bin are forced to the same voltage level, such that:

$$0.30*Rin+0.59*Rin+0.11*Rin=2.0 \text{ V} \quad (3)$$

$$1*Rin=2.0 \text{ V} \quad (4)$$

$$Rin=Gin=Bin=2.0 \text{ V} \quad (5)$$

Therefore, the single clamping circuit of the present invention, using the separate luminance signal Y as a feedback signal, forces the blanking level of the input signals Rin, Gin and Bin and the separate luminance signal Y to the known value equal to the constant reference voltage level, during the burst period. In the preferred embodiment, this level is equal to two volts. Once the blank levels of the input signals Rin, Gin and Bin and the separate luminance signal Y are clamped to this known level, during the burst period, the blank levels will remain at that known level throughout the non-burst period of the separate luminance signal Y.

During the time period when the burst flag signal is active, the differential amplifier 24 and the NPN transistor followers 26, 30 and 34 are enabled. The differential amplifier 24 compares the separate luminance signal Y, received from the Y-Matrix circuit 22, to the constant reference voltage signal and provides the difference signal representing the difference between the value of the separate luminance signal Y and the constant reference voltage signal. This difference signal is then provided through the NPN transistor followers 26, 30 and 34 to the second terminal of the capacitors Cr, Cg and Cb, respectively. The voltage level across the capacitors Cr, Cg and Cb is then either increased or decreased according to the level of the output signal from the differential amplifier 24, in order to adjust the level of the voltage stored across the capacitors Cr, Cg and Cb to equal the constant reference voltage signal. The voltages stored across the capacitors Cr, Cg and Cb are passed through the NPN transistor followers 28, 32 and 36 and provided to the Y-Matrix circuit 22. The Y-Matrix circuit 22 then combines these voltages, weighted according to the equation (1), and provides the separate luminance signal Y. During the burst period, the separate luminance signal Y is continuously compared to the constant reference voltage signal and the difference is used to adjust the blank levels of the input signals Rin, Gin and Bin, as needed, in order to ensure that the blank level of the separate luminance signal Y is equal to the constant reference voltage signal.

During the non-burst periods, when the burst flag signal is inactive, the differential amplifier 24 and the NPN transistor followers 26, 30 and 34 are disabled. During this time period, the input signals Rin, Gin and Bin are passed through the NPN transistor followers 28, 32 and 36 and provided to the Y-Matrix circuit 22. The Y-Matrix circuit 22 then combines the input signals Rin, Gin and Bin, weighted according to the equation (1), and provides the separate luminance signal Y as the output signal from the luminance signal generation circuit. After being clamped during the burst periods, the blank level of the separate luminance signal Y will remain at the known level of the constant reference voltage signal during the non-burst period.

The luminance signal generation circuit of the present invention uses only a single clamping circuit to clamp the blank level of the separate luminance signal Y and the input signals Rin, Gin and Bin to a constant reference voltage level. The components of the signals can then be readily determined from the differences between their amplitude and the constant reference voltage level. Accordingly, the separate luminance signal Y will accurately reflect the values of the input signals Rin, Gin and Bin, even though they are brought in from an outside system. The number of external components and pins required by the luminance signal generation circuit with single clamp according to the present invention is therefore substantially reduced compared to the four clamping circuits required by the prior art circuit illustrated in FIG. 1. No PNP transistors are required within the luminance signal generation circuit and single clamping circuit. Only high speed NPN transistor follower circuits are used within the preferred embodiment. The separate luminance signal Y is also used as a feedback signal from which the level of adjustments made to the blank levels of the input signals Rin, Gin and Bin is derived.

Figure 3A:
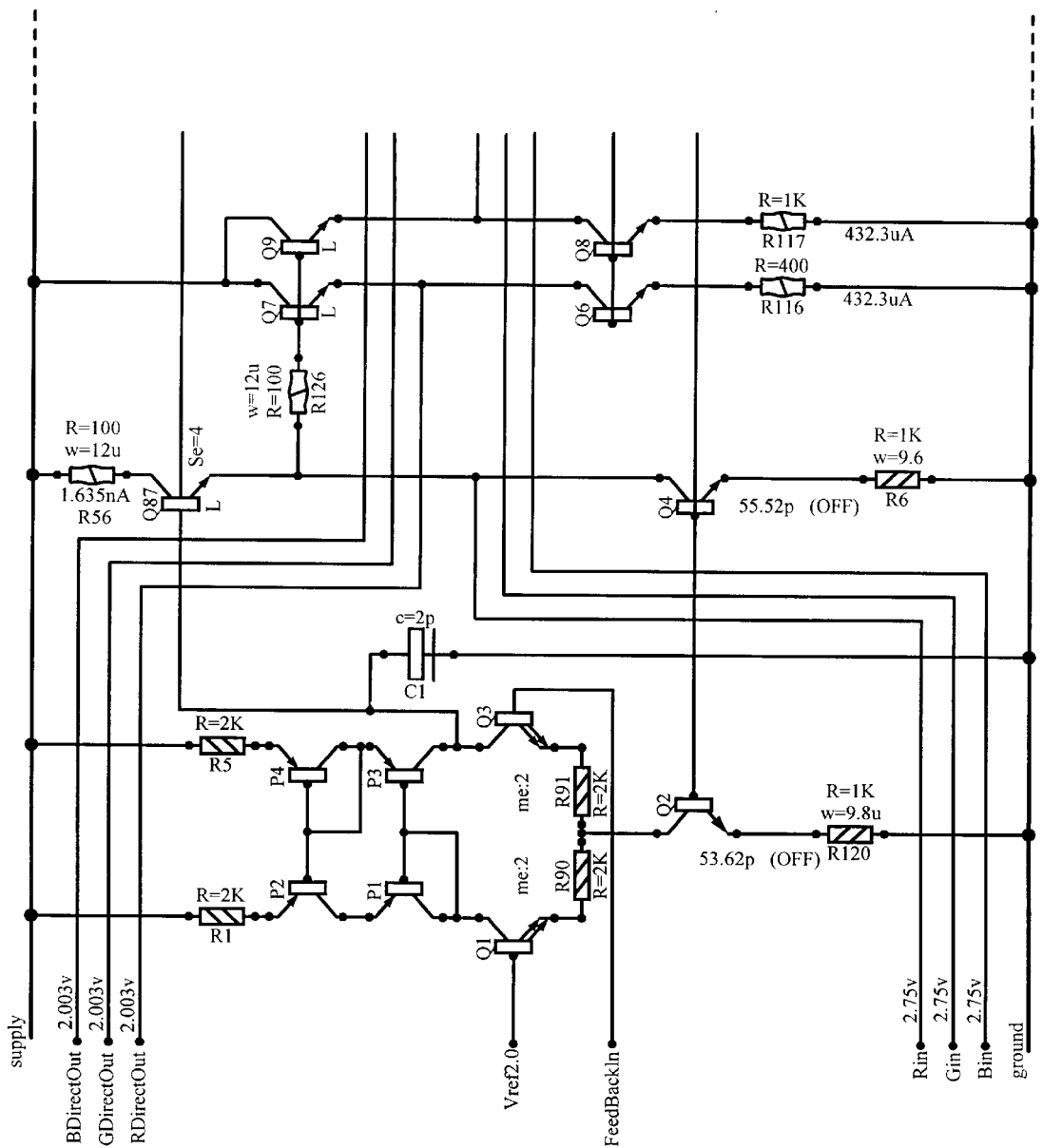
FIG. 3 illustrates a detailed schematic diagram of the luminance signal generation circuit including a single clamping circuit according to the present invention.
Figure 3B:
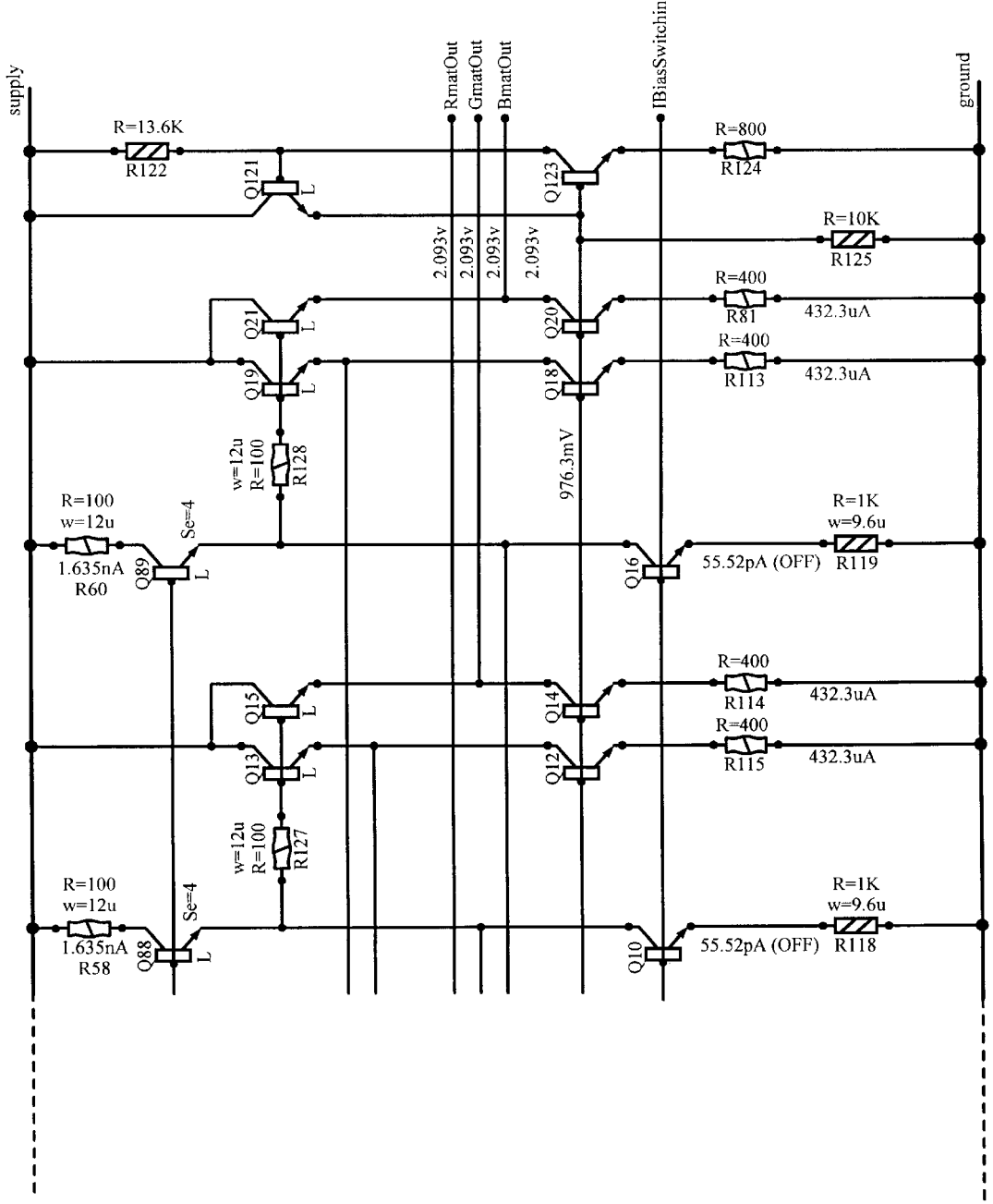

A detailed circuit schematic of the preferred embodiment of the clamping circuit portion of the luminance signal generation circuit of the present invention is illustrated in FIG. 3. The preferred embodiment of the present invention is implemented within an analog video encoder integrated circuit, Part No. CXA2075, which will be available from Sony Corporation of America, 3300 Zanker Road, San Jose, Calif. 95134.

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A luminance signal generation apparatus for generating a luminance signal representing RGB input signals, comprising:
   a. a plurality of input receiving circuits configured to receive RGB input signals;
   b. a combining circuit coupled to the plurality of input receiving circuits for providing a luminance signal representing the RGB input signals, wherein the RGB input signals and the luminance signal all have a blanking level; and
   c. a clamping circuit coupled to the combining circuit to receive the luminance signal, to receive a constant reference voltage signal and to the plurality of input receiving circuits for adjusting the blanking level of the RGB input signals according to a difference between a blanking level of the luminance signal and the constant reference voltage signal, wherein the clamping circuit is enabled only during a burst period and further comprises a differential amplifier coupled to receive the luminance signal and to receive the constant reference voltage signal for comparing the luminance signal to the constant reference voltage signal and providing a difference signal representing the difference between the blanking level of the luminance signal and the constant reference voltage signal.

2. The luminance signal generation apparatus as claimed in claim 1 wherein the clamping circuit is further coupled to receive a burst flag signal representing the burst period.

3. The luminance signal generation apparatus as claimed in claim 1 wherein the difference signal is provided to the plurality of input receiving circuits for adjusting the blanking level of the RGB input signals.

4. The luminance signal generation apparatus as claimed in claim 3 wherein the constant reference voltage signal has a level equal to two volts.

5. The luminance signal generation apparatus as claimed in claim 4 wherein the apparatus is implemented within an integrated circuit and includes only components internal to the integrated circuit.

6. A clamping circuit for clamping a blanking level of a separate luminance signal generated from RGB signals comprises:

a. an amplifying circuit configured to receive the luminance signal generated from the RGB signals and a constant reference voltage signal for comparing the luminance signal to the constant reference voltage signal and providing a difference signal representing a difference between the luminance signal and the constant reference voltage signal; and b. a plurality of input adjusting circuits, each coupled to the amplifying circuit and to a respective RGB signal for using the difference signal to adjust a blanking level of the RGB signals.

7. The clamping circuit as claimed in claim 6 wherein the amplifying circuit and the plurality of input adjusting circuits are enabled only during a burst period.

8. The clamping circuit as claimed in claim 7 wherein the amplifying circuit includes a differential amplifier for providing the difference signal.

9. The clamping circuit as claimed in claim 8 wherein the constant reference voltage signal has a level equal to two volts.

10. The clamping circuit as claimed in claim 9 wherein the circuit is implemented within an integrated circuit and includes only components internal to the integrated circuit.

11. A video encoder circuit including a separate luminance signal generation circuit for receiving RGB signals and providing a luminance signal representing the RGB input signals, the separate luminance signal generation circuit comprising:

a. a plurality of input receiving circuits configured to receive the RGB input signals;

b. a combining circuit coupled to the plurality of input receiving circuits for providing the luminance signal representing the RGB input signals, wherein the RGB input signals and the luminance signal all have a blanking level; and c. a clamping circuit for clamping the blanking level of the separate luminance signal including:

i. an amplifying circuit including a differential amplifier for providing a difference signal and configured to receive the luminance signal and a constant reference voltage signal for comparing the luminance signal to the constant reference voltage signal and providing the difference signal representing a difference between the luminance signal and the constant reference voltage signal; and ii. a plurality of input adjusting circuits, each coupled to the amplifying circuit and to the plurality of input receiving circuits for adjusting the blanking level of the RGB signals according to the difference signal, wherein the clamping circuit is coupled to receive a burst flag signal representing a burst period and is enabled only during the burst period when the burst flag signal is active.

12. The video encoder circuit as claimed in claim 11 wherein the constant reference voltage signal has a level equal to two volts.

13. The video encoder circuit as claimed in claim 11 wherein the circuit is implemented within an integrated circuit and further wherein the separate luminance signal generation circuit includes only components internal to the integrated circuit.

* * * * *